Oct. 21, 1924.

R. C. RICHARDSON

HAY DRIER

Filed May 31, 1922

Witness

Inventor
R. C. Richardson
By C. A. Snow & Co.
Attorneys

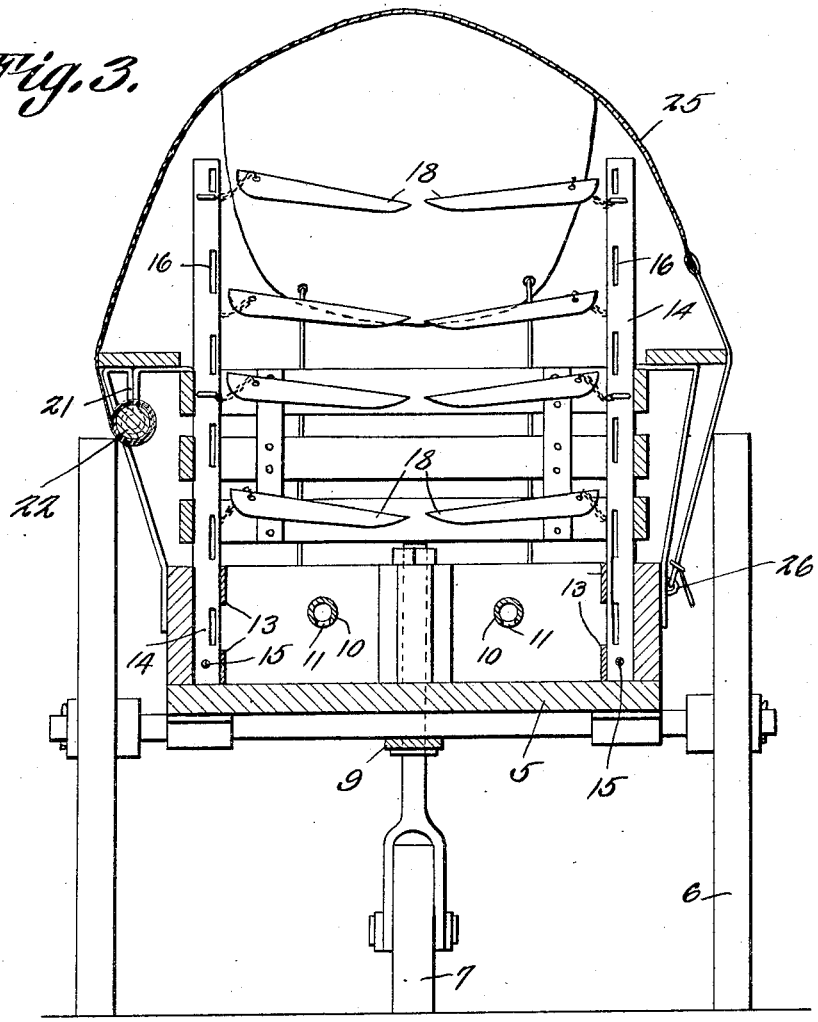

Patented Oct. 21, 1924.

1,512,052

UNITED STATES PATENT OFFICE.

ROBERT CHRISTOPHER RICHARDSON, OF MUNFORDVILLE, KENTUCKY.

HAY DRIER.

Application filed May 31, 1922. Serial No. 565,001.

*To all whom it may concern:*

Be it known that I, ROBERT C. RICHARDSON, a citizen of the United States, residing at Munfordville, in the county of Hart and State of Kentucky, have invented a new and useful Hay Drier, of which the following is a specification.

My invention relates to hay driers and more specifically to a portable machine of this character.

It has been my experience that hay left in the field to dry rots or the quality of the same is impaired. Knowing the above and that sun cured hay is the best standard, it is the primary object of the invention to provide a drier which will allow the hay to dry evenly in the sun and at the same time protect the same from damp weather.

A second object of the invention is to provide an open air hay drier which embodies a novel means for holding the hay up and prevents the same from packing.

Another object is to combine a vehicle and a hay drier which may be arranged in trains and towed off the field to the railway cars for shipment.

Another important object of the present invention is to provide a drier which is adapted to dry hay, cow-peas, clover, etc., having an improved cover mounted thereon that is disposed so as not to interfere with the loading of the machine or other operations connected therewith.

An additional object of the invention is to provide a drier of the above mentioned character which is simple in construction, consists of few parts, and which may be manufactured and placed on the market at a minimum cost.

The invention consists of combinations, arrangements of parts, operations, and general assemblage which will be hereinafter described and illustrated.

In the drawing Figure 1 is a longitudinal sectional view through my improved hay drier.

Figure 3 is a transverse sectional view of the drier.

Figure 4 is a perspective of one of the anchoring pins.

Figure 5 is a transverse sectional view taken through the operating handle.

Figure 1:
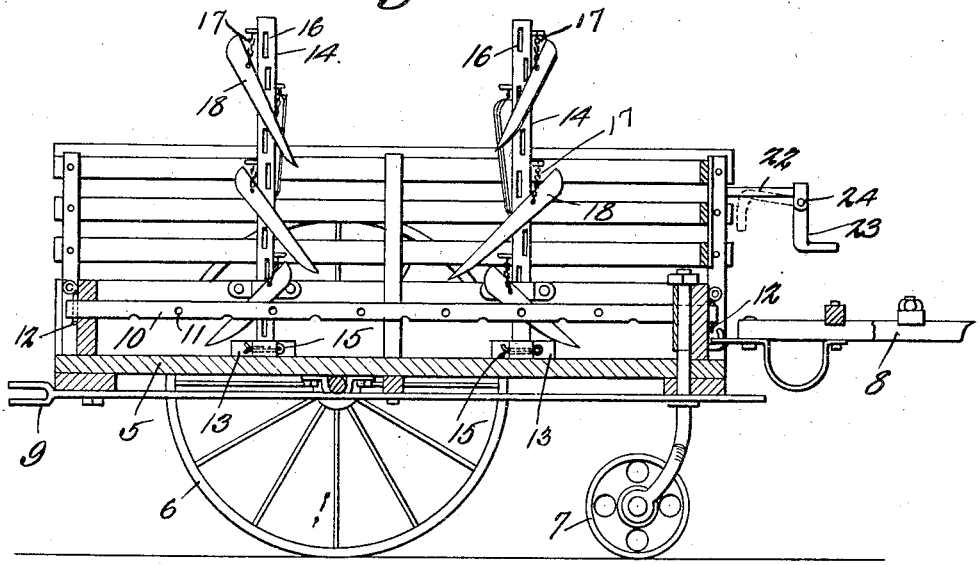
Figure 2:
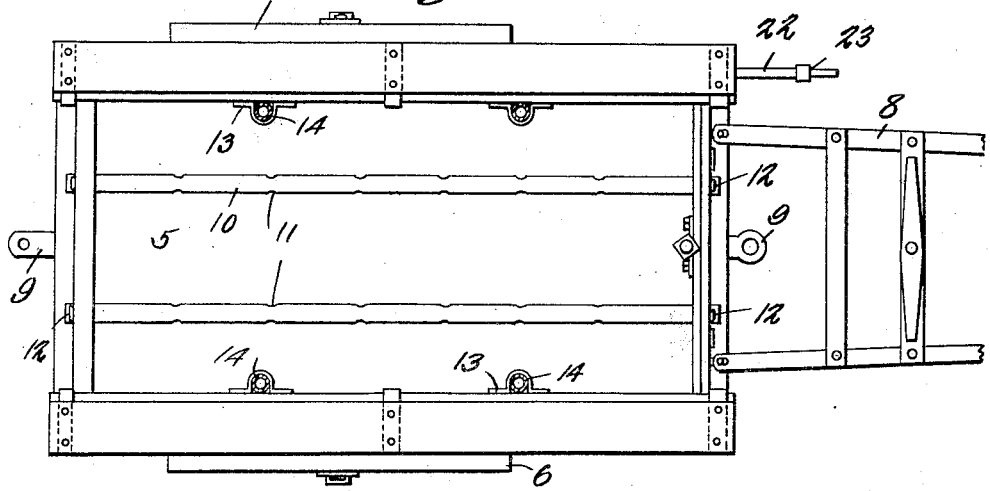
Figure 2 is a top plan view of the same.

Referring to the drawing wherein like characters of reference indicate like parts in all the views, the numeral 5 designates a vehicle body of any desired construction which is mounted on the rear wheels 6 and the front swiveled wheel 7. The vehicle body is equipped with shafts 8 for hitching the machine to a draft animal. However it is desirable that as a number of vehicles be placed in a train so each is provided with a coupling bar 9.

Extending longitudinally of the body 5 at its bottom and having their ends mounted in the end walls of the body are air conducting pipes 10 which are provided with perforations 11. The ends of these pipes extend through the end walls and are secured in position by pins or other fastenings 12.

Mounted in transverse alignment upon the inner face of the side boards of this vehicle body 5 are arcuate straps or holders 13 in which vertically extending pipes or tubes 14 are removably mounted. Pins 15 extend through these straps and the tubes 14 to retain the latter in place. Openings 16 are provided in these pipes or tubes which allow air to pass therethrough and into the hay contained in the body.

Depending from each of the ventilating pipes are short chains 17, these chains being arranged the entire length of the pipes. Attached to each of these chains is a ventilator or drier finger 18 which is adapted to engage in the hay and conduct air thereto. These fingers 18 are formed from plates of metal bent upon themselves being U-shaped in cross section and have their longitudinal edges beveled so that the fingers taper from one end to the other to facilitate their insertion in the hay.

Mounted in bearings 21 upon the side of the vehicle body is a shaft 22 which is rotated by a crank handle 23 that is hinged to this shaft as indicated by the numeral 24. This crank handle 23 is provided with a groove 24' which accommodates the shaft 22 when the handle is folded inwardly and not in use. A waterproof cover 25 has one end secured to the shaft 22 and is adapted to be wound upon the same, the cover being adapted to pass over the load in the body 5 and engage with the buttons 26 upon that side of the machine opposite the side having the shaft 22 mounted thereon. This cover is only used in damp or wet weather.

After the hay has been cut it is placed in the vehicle and the fingers 18 engaged in the hay. A number of these machines are coupled together and drawn to the field from whence they are drawn to the point of shipment.

The disclosure is merely illustrative and in no sense am I limited to the precise construction set forth. It should be known that the invention is susceptible to various modifications and that my limits of modification are only governed by the subjoined claims.

What is claimed is:—

1. In a hay drying machine, a wheeled body, horizontal perforated air conducting pipes arranged in the bottom of the body, vertical perforated pipes mounted in the body, flexible elements depending from the vertical pipes, a ventilator finger suspended from each of the flexible elements adapted to engage in the hay to conduct air into the same, said fingers being U-shaped in cross section and tapering toward one end.

2. In a hay drying machine, a wheeled body, perforated air conducting pipes arranged longitudinally of said body and supported in the end thereof at a point above the bottom, upright perforated pipes supported at the sides of the body on the inner faces thereof and ventilator fingers flexibly connected at one end to said upright pipes, said fingers tapering toward their free ends to facilitate their insertion in the hay.

In testimony that I claim the foregoing as my own, I have hereto affixed my signature in the presence of two witnesses.

ROBERT CHRISTOPHER RICHARDSON.

Witnesses:
JOHN H. RICHARDSON,
W. M. HARPER.